US011862386B2

(12) United States Patent
Kang et al.

(10) Patent No.: US 11,862,386 B2
(45) **Date of Patent: *Jan. 2, 2024**

(54) COIL COMPONENT

(71) Applicant: SAMSUNG ELECTRO-MECHANICS CO., LTD., Suwon-si (KR)

(72) Inventors: Byung Soo Kang, Suwon-si (KR); Byeong Cheol Moon, Suwon-si (KR); Joung Gul Ryu, Suwon-si (KR); Ju Hwan Yang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 113 days.

This patent is subject to a terminal disclaimer.

(21) Appl. No.: 17/399,752

(22) Filed: Aug. 11, 2021

(65) Prior Publication Data

US 2021/0375530 A1 Dec. 2, 2021

Related U.S. Application Data

(63) Continuation of application No. 16/164,278, filed on Oct. 18, 2018, now Pat. No. 11,107,622.

(30) Foreign Application Priority Data

May 23, 2018 (KR) ........................ 10-2018-0058576

(51) Int. Cl.
*H01F 27/32* (2006.01)
*H01F 27/29* (2006.01)
(Continued)

(52) U.S. Cl.
CPC ....... *H01F 27/292* (2013.01); *H01F 27/2804* (2013.01); *H01F 27/327* (2013.01);
(Continued)

(58) Field of Classification Search
CPC .. H01F 27/292; H01F 27/2804; H01F 27/327; H01F 27/346; H01F 41/041;
(Continued)

(56) References Cited

U.S. PATENT DOCUMENTS 5,349,496 A 9/1994 Taniguchi
9,236,171 B2 1/2016 Ito et al.
(Continued)

FOREIGN PATENT DOCUMENTS

CN 103180919 A 6/2013
CN 105321685 A 2/2016
(Continued)

OTHER PUBLICATIONS

Chinese Office Action dated May 31, 2021, issued in Chinese Patent Application No. 201811581578.5 (with English translation).
(Continued)

*Primary Examiner* — Mang Tin Bik Lian
(74) *Attorney, Agent, or Firm* — Morgan, Lewis & Bockius LLP

(57) ABSTRACT

A coil component includes a body having a first surface and a second surface opposing each other in a thickness direction of the body and including a core formed in the thickness direction; a coil part embedded in the body and including at least one turn around the core; an insulating layer disposed on the first surface of the body; a bonded conductive layer disposed on the insulating layer and having a surface roughness of the first surface which is in contact with the insulating layer greater than a surface roughness of the second surface opposing the first surface of the bonded conductive layer; and external electrodes connected to the coil part and covering the bonded conductive layer.

13 Claims, 6 Drawing Sheets

A

III - III'

(51) Int. Cl.
*H01F 27/28* (2006.01)
*H01F 41/04* (2006.01)
*H01F 27/34* (2006.01)

(52) U.S. Cl.
CPC ......... *H01F 27/346* (2013.01); *H01F 41/041* (2013.01); *H01F 2027/2809* (2013.01)

(58) Field of Classification Search
CPC ....... H01F 2027/2809; H01F 2017/048; H01F 17/0013; H01F 17/04; H01F 17/0006; H01F 27/28; H01F 27/323; H01F 27/324; H01F 2017/0073; H01F 27/022; H01F 2017/002
See application file for complete search history.

(56) References Cited

U.S. PATENT DOCUMENTS

| | | | | |
|---|---|---|---|---|
| 2009/0045899 | A1* | 2/2009 | Masai | H01L 23/5227 336/172 |
| 2012/0274432 | A1 | 11/2012 | Jeong | |
| 2013/0170099 | A1 | 7/2013 | Lee | |
| 2013/0222101 | A1 | 8/2013 | Ito | |
| 2015/0002253 | A1* | 1/2015 | Kwon | H01F 17/0006 336/219 |
| 2015/0053472 | A1 | 2/2015 | Lee | |
| 2015/0109088 | A1 | 4/2015 | Kim | |
| 2015/0294802 | A1 | 10/2015 | Kato | |
| 2016/0012956 | A1* | 1/2016 | Yang | H01F 41/042 336/200 |
| 2016/0035476 | A1 | 2/2016 | Mimura et al. | |
| 2016/0086714 | A1* | 3/2016 | Moon | H01F 27/255 336/200 |
| 2016/0240296 | A1* | 8/2016 | Kim | H01F 17/04 |
| 2016/0268038 | A1 | 9/2016 | Choi | |
| 2018/0082787 | A1 | 3/2018 | Hamamori | |
| 2018/0158607 | A1 | 6/2018 | Mizushiro | |

FOREIGN PATENT DOCUMENTS

| | | | |
|---|---|---|---|
| JP | 2009-099572 | A | 5/2009 |
| JP | WO2017/022813 | A1 | 2/2017 |
| KR | 10-2013-0049207 | A | 5/2013 |
| KR | 10-2016-0031390 | A | 3/2016 |
| KR | 10-2016-0099882 | A | 8/2016 |
| KR | 10-2016-0108935 | A | 9/2016 |

OTHER PUBLICATIONS

U.S. Notice of Allowance dated May 11, 2021 issued in U.S. Appl. No. 16/164,278.

U.S. Non-final Office Action dated Jan. 6, 2021 issued in U.S. Appl. No. 16/164,278.

Korean Office Action dated Jul. 1, 2019 issued in Korean Patent Application No. 10-2018-0058576.

* cited by examiner

III - III'

IV - IV'

COIL COMPONENT

CROSS-REFERENCE TO RELATED APPLICATION(S)

This application is a continuation of U.S. patent application Ser. No. 16/164,278, filed on Oct. 18, 2018, which claims the benefit of priority to Korean Patent Application No. 10-2018-0058576, filed on May 23, 2018 in the Korean Intellectual Property Office, the disclosures of which are incorporated herein by reference in their entireties.

TECHNICAL FIELD

The present disclosure relates to a coil component.

BACKGROUND

An inductor, a coil component, is a representative passive electronic component used in an electronic device together with a resistor and a capacitor.

As electronic devices gradually gain higher performance and become smaller, the number of electronic components used in the electronic device is increased while being miniaturized.

External electrodes of the coil component are typically formed by applying a conductive paste, or by a plating process. In the former case, thicknesses of the external electrodes are increased and a thickness of the coil component may be thus increased, and in the later case, since a plating resist necessary for plating is formed, the number of processes may be increased.

SUMMARY

An aspect of the present disclosure may provide a coil component having an improved breakdown voltage (BDV).

An aspect of the present disclosure may also provide a coil component capable of easily forming a shielding structure that reduces a leakage magnetic flux.

An aspect of the present disclosure may also provide a coil component having improved flatness of a mounting surface.

According to an aspect of the present disclosure, a coil component may include a body having a first surface and a second surface opposing each other in a thickness direction of the body and including a core formed in the thickness direction; a coil part embedded in the body and including at least one turn around the core; an insulating layer disposed on the first surface of the body; a bonded conductive layer disposed on the insulating layer and having a surface roughness of the first surface which is in contact with the insulating layer greater than a surface roughness of the second surface opposing the first surface of the bonded conductive layer; and external electrodes connected to the coil part and covering the bonded conductive layer.

According to another aspect of the present disclosure, a coil component may include a body having a first surface and a second surface opposing each other in a thickness direction of the body and including a core formed in the thickness direction; a coil part embedded in the body and including at least one turn around the core; an insulating layer disposed on the first surface of the body; a bonded conductive layer disposed on the insulating layer and having a surface roughness of the first surface which is in contact with the insulating layer different than a surface roughness of the second surface opposing the first surface of the bonded conductive layer; and external electrodes connected to the coil part and covering the bonded conductive layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
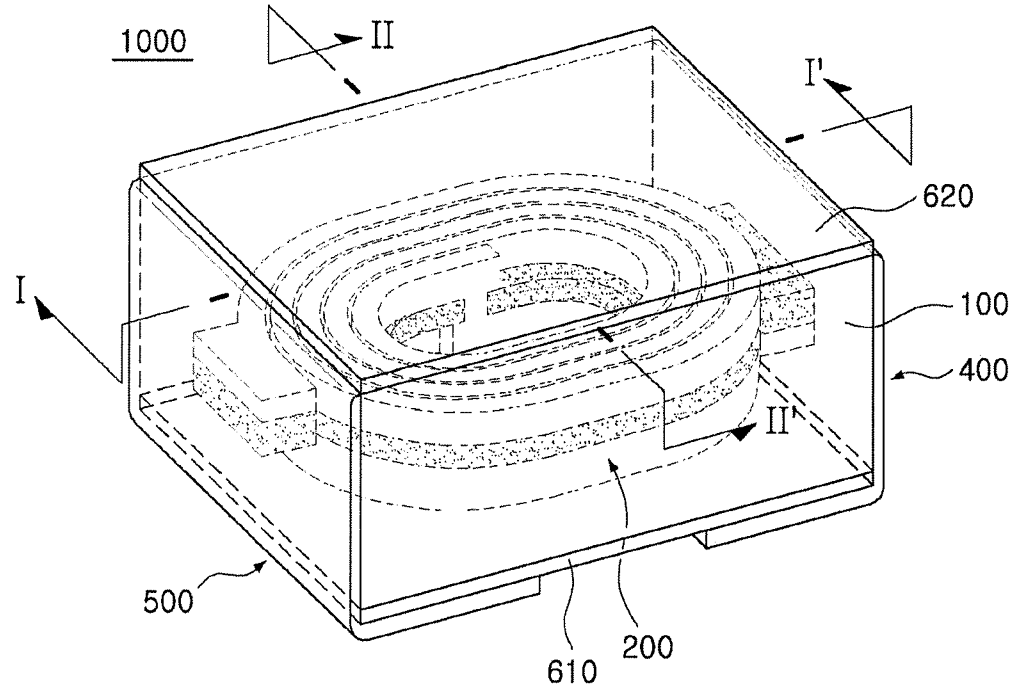
FIG. 1 is a perspective view schematically illustrating a coil component according to a first exemplary embodiment in the present disclosure.

Hereinafter, exemplary embodiments of the present disclosure will now be described in detail with reference to the accompanying drawings.

In the drawings, an L direction refers to a first direction or a length direction, a W direction refers to a second direction or a width direction, and a T direction refers to a third direction or a thickness direction.

Hereinafter, a coil component according to an exemplary embodiment in the present disclosure will be described in detail with reference to the accompanying drawings. In describing an exemplary embodiment in the present disclosure with reference to the accompanying drawings, components that are the same as or correspond to each other will be denoted by the same reference numerals, and an overlapped description thereof will be omitted.

Various types of electronic components may be used in electronic devices. Various types of coil components may be appropriately used for the purpose of noise removal or the like between such electronic components.

That is, a coil component in the electronic device may be used as a power inductor, a high frequency (HF) inductor, a general bead, a high frequency (GHz) bead, a common mode filter, or the like.

First Exemplary Embodiment

Figure 2:
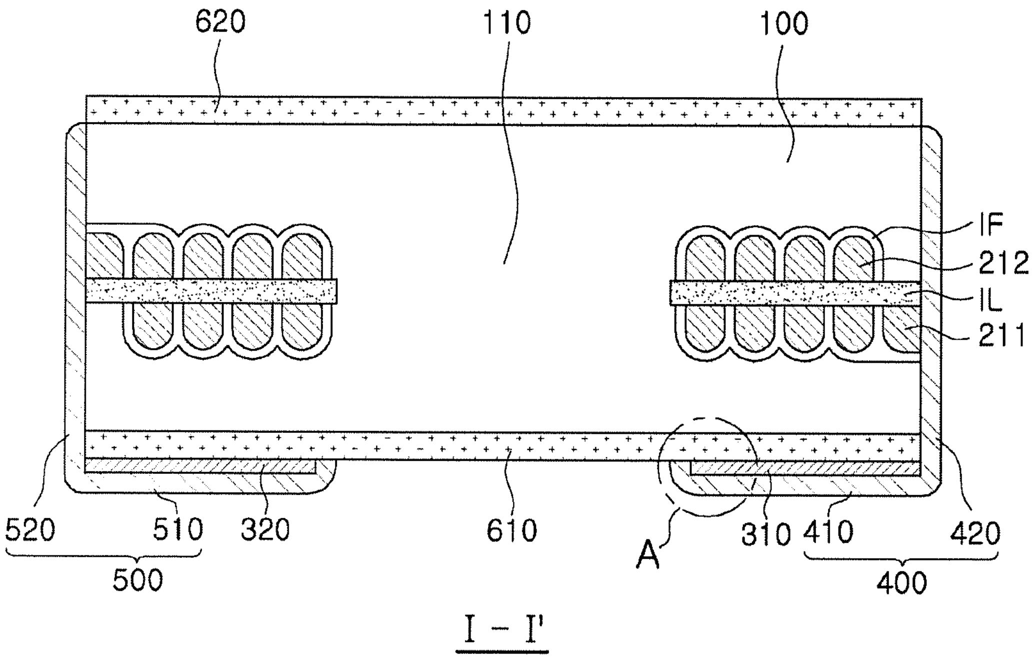
FIG. 2 is a view illustrating a cross section taken along a line I-I' of FIG. 1.
Figure 3:
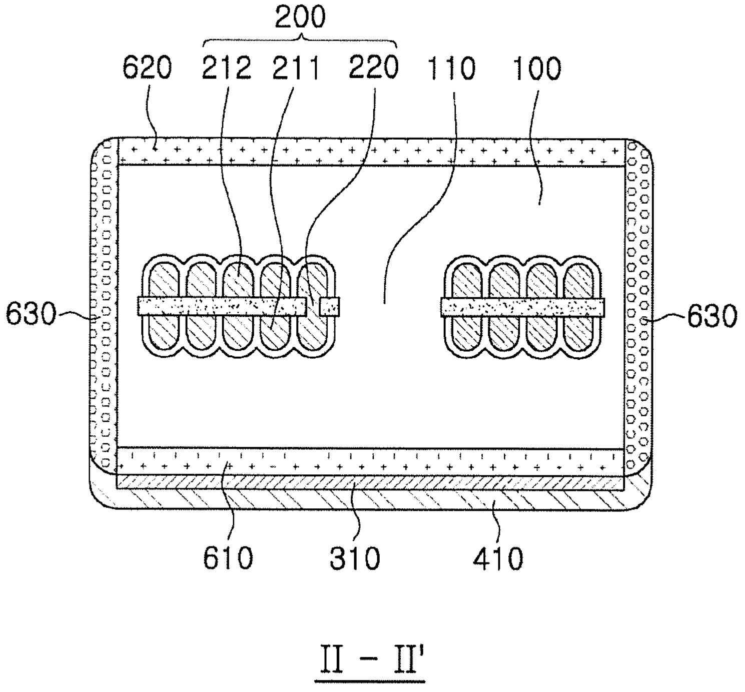
FIG. 3 is a view illustrating a cross section taken along a line II-II' of FIG. 1.
Figure 4:
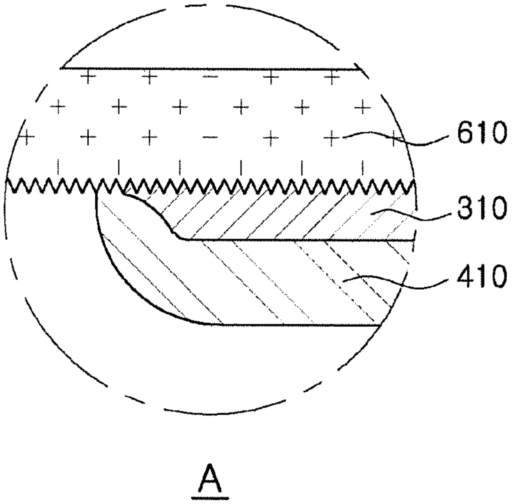
FIG. 4 is an enlarged view of a part A of FIG. 2.

FIG. 1 is a perspective view schematically illustrating a coil component according to a first exemplary embodiment in the present disclosure. FIG. 2 is a view illustrating a cross section taken along a line I-I' of FIG. 1. FIG. 3 is a view illustrating a cross section taken along a line II-II' of FIG. 1. FIG. 4 is an enlarged view of a part A of FIG. 2.

Referring to FIGS. 1 through 4, a coil component 1000 according to an exemplary embodiment in the present disclosure may include a body 100, a coil part 200, bonded conductive layers 310 and 320, external electrodes 400 and 500, and insulating layers 610, 620, and 630, and may further include an internal insulating layer IL and an insulating film IF.

The body 100 may form an outer shape of the coil component 1000 according to the present exemplary embodiment and may have the coil part 200 embedded therein.

The body 100 may be formed in a hexahedral shape as a whole.

Hereinafter, a first exemplary embodiment in the present disclosure will be described on the assumption that the body 100 has illustratively the hexahedral shape. However, such a description does not exclude a coil component including a body formed in a shape other than the hexahedral shape from the scope of the exemplary embodiment in the present disclosure.

Referring to FIG. 1, the body 100 may include a first surface and a second surface opposing each other in a length direction L, a third surface and a fourth surface opposing each other in a width direction W, and a fifth surface and a sixth surface opposing each other in a thickness direction T. The first to fourth surfaces of the body 100 may correspond to wall surfaces of the body 100 connecting the fifth surface and the sixth surface of the body 100 to each other. The wall surfaces of the body 100 may include the first surface and the second surface, which are both end surfaces opposing each other, and the third surface and the fourth surface, which are both side surfaces opposing each other.

The body 100 may be illustratively formed so that the coil component 1000 according to the present exemplary embodiment in which the external electrodes 400 and 500 to be described below are formed has a length of 2.0 mm, a width of 1.2 mm, and a thickness of 0.65 mm, but is not limited thereto.

The body 100 may contain a magnetic material and a resin. Specifically, the body 100 may be formed by stacking one or more magnetic composite sheets in which the magnetic material is dispersed in the resin. However, the body 100 may also have a structure other than the structure in which the magnetic material is dispersed in the resin. For example, the body 100 may also be formed of the magnetic material such as a ferrite.

The magnetic material may be a ferrite or a metallic magnetic powder.

The ferrite may include at least one or more of a spinel type ferrite such as Mg—Zn based, Mn—Zn based, Mn—Mg based, Cu—Zn based, Mg—Mn—Sr based, Ni—Zn based, or the like, a hexagonal type ferrite such as Ba—Zn based, Ba—Mg based, Ba—Ni based, Ba—Co based, Ba—Ni—Co based, or the like, and garnet type ferrite such as Y-based or the like, and Li-based ferrite.

The metallic magnetic powder may include one or more selected from a group consisting of iron (Fe), silicon (Si), chromium (Cr), cobalt (Co), molybdenum (Mo), aluminum (Al), niobium (Nb), copper (Cu), and nickel (Ni). For example, the metallic magnetic powder may include at least one or more of pure iron powder, Fe—Si based alloy powder, Fe—Si—Al based alloy powder, Fe—Ni based alloy powder, Fe—Ni—Mo based alloy powder, Fe—Ni—Mo—Cu based alloy powder, Fe—Co based alloy powder, Fe—Ni—Co based alloy powder, Fe—Cr based alloy powder, Fe—Cr—Si based alloy powder, Fe—Si—Cu—Nb based alloy powder, Fe—Ni—Cr based alloy powder, Fe—Cr—Al based alloy powder, and the like.

The metallic magnetic powder may be amorphous or crystalline. For example, the metallic magnetic powder may be Fe—Si—B—Cr based amorphous alloy powder, but is not necessarily limited thereto.

Each of the ferrite and the metallic magnetic powder may have an average diameter of about 0.1 μm to 30 μm, but is not limited thereto.

The body 100 may include two or more kinds of magnetic materials dispersed in the resin. Here, a meaning that the magnetic materials are different kinds means that the magnetic materials dispersed in the resin are distinguished from each other by any one of an average diameter, a composition, a crystallinity and a shape.

The resin may include, but is not limited to, epoxy, polyimide, liquid crystal polymer, etc., alone or in combination.

The body 100 may include a core 110 penetrating through the coil part 200 to be described below. The core 110 may be formed by filling a through-hole of the coil part 200 with the magnetic composite sheet, but is not limited thereto. The coil part 200 to be described below may format least one turn around the core 110.

The coil part 200 may be embedded in the body 100 to manifest the characteristics of the coil component. For example, in a case in which the coil component 1000 is utilized as a power inductor, the coil part 200 may serve to stabilize power of the electronic device by storing an electric field as a magnetic field and maintaining an output voltage.

The coil part 200 may include a first coil pattern 211, a second coil pattern 212, and a via 220, and the first coil pattern 211 and the second coil pattern 212 may be sequentially stacked along a thickness direction T of the body 100.

Each of the first coil pattern 211 and the second coil pattern 212 may be in the form of a plane spiral having at least one turn formed around the core 110. As an example, the first coil pattern 211 may form at least one turn around the core 110 on a lower surface of the internal insulating layer IL.

The via 220 may penetrate through the internal insulating layer IL to electrically connect the first coil pattern 211 and the second coil pattern 212 to each other and may be in contact with the first coil pattern 211 and the second coil pattern 212, respectively. As a result, the coil part 200 applied to the present exemplary embodiment may be formed as a single coil generating a magnetic field in the thickness direction (T) of the body 100.

At least one of the first coil pattern 211, the second coil pattern 212, and the via 220 may include one or more conductive layers.

As an example, in a case in which the second coil pattern 212 and the via 220 are formed by plating, the second coil pattern 212 and the via 220 may include a seed layer of an electroless plating layer and an electroplating layer. Here, the electroplating layer may have a single layer structure or a multilayer structure. The electroplating layer having the multilayer structure may also be formed in a conformal film structure in which the other electroplating layer covers any one electroplating layer, or may also be formed in a shape in which the other electroplating layer is stacked only on one surface of any one electroplating layer. The seed layer of the second coil pattern 212 and the seed layer of the via 220 may be integrally formed without forming a boundary therebetween, but are not limited thereto. The electroplating layer of the second coil pattern 212 and the electroplating layer of the via 220 may be integrally formed without forming a boundary therebetween, but are not limited thereto.

As another example, in a case in which the first coil pattern 211 and the second coil pattern 211 are separately formed and are then stacked together on the internal insulating layer IL to form the coil portion 200, the via 220 may include a high melting point metal layer and a low melting point metal layer having a melting point lower than the melting point of the high melting point metal layer. Here, the low melting point metal layer may be formed of a solder including a lead (Pb) and/or tin (Sn). The low melting point metal layer is at least partially melted due to the pressure and temperature at the time of stacking together of the first coil pattern 211 and the second coil pattern 212, such that an inter metallic compound (IMC) layer may be formed between the low melting point metal layer and the second coil pattern 212.

As an example, the first coil pattern 211 and the second coil pattern 212 may protrude on a lower surface and an upper surface of the internal insulating layer IL, respectively, as illustrated in FIGS. 2 and 3. As another example, the first coil pattern 211 is embedded in the lower surface of the internal insulating layer IL such that a lower surface of the first coil pattern 211 may be exposed to the lower surface of the internal insulating layer IL, and the second coil pattern 212 may protrude on the upper surface of the internal insulating layer IL. In this case, a concave portion may be formed in the lower surface of the first coil pattern 211. As a result, the lower surface of the internal insulating layer IL and the lower surface of the first coil pattern 211 may not be positioned on the same plane. As another example, the first coil pattern 211 is embedded in the lower surface of the internal insulating layer IL such that the lower surface of the first coil pattern 211 may be exposed to the lower surface of the internal insulating layer IL, and the second coil pattern 212 is embedded in the upper surface of the internal insulating layer IL such that an upper surface of the second coil pattern 212 may be exposed to the upper surface of the internal insulating layer IL.

End portions of the first coil pattern 211 and the second coil pattern 212, respectively, may be exposed to the first surface and the second surface of the body 100. The end portion of the first coil pattern 211 exposed to the first surface of the body 100 may be in contact with a first external electrode 400 to be described above, such that the first coil pattern 211 may be electrically connected to the first external electrode 400. The end portion of the second coil pattern 212 exposed to the second surface of the body 100 may be in contact with a second external electrode 500 to be described above, such that the second coil pattern 212 may be electrically connected to the second external electrode 500.

Each of the first coil pattern 211, the second coil pattern 212, and the via 220 may be formed of a conductive material such as copper (Cu), aluminum (Al), silver (Ag), tin (Sn), gold (Au), nickel (Ni), lead (Pb), titanium (Ti), or alloys thereof, but is not limited thereto.

The internal insulating layer IL may be formed of an insulating material including a thermosetting insulating resin such as an epoxy resin, a thermoplastic insulating resin such as polyimide, or a photosensitive insulating resin, or may be formed of an insulating material having a reinforcement material such as a glass fiber or an inorganic filler impregnated in the insulating resin. As an example, the internal insulating layer IL may be formed of an insulating material such as prepreg, Ajinomoto Build-up Film (ABF), FR-4, Bismaleimide Triazine (BT) resin, photo imagable dielectric (PID), or the like.

As an inorganic filler, at least one selected from the group consisting of silica ($SiO_2$), alumina ($Al_2O_3$), silicon carbide (SiC), barium sulfate ($BaSO_4$), talc, clay, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

In a case in which the internal insulating layer IL is formed of the insulating material including the reinforcement material, the internal insulating layer IL may provide more excellent rigidity. In a case in which the internal insulating layer IL is formed of an insulating material that does not include the glass fiber, the internal insulating layer IL may be advantageous for thinning the total thickness of the coil part 200. In a case in which the internal insulating layer IL is formed of the insulating material including the photosensitive insulating resin, the number of processes for forming the coil part 200 may be reduced, which is advantageous in reducing the production cost, and a fine via 220 may be formed.

The insulating film IF may be formed along the surfaces of the first coil pattern 211, the internal insulating layer IL, and the second coil pattern 212. The insulating film IF, which protects and insulates the respective coil patterns 211 and 212, may include a known insulating material such as parylene. The insulating material included in the insulating film IF may be any material and is not particularly limited. The insulating film IF may be formed by vapor deposition or the like, but is not limited thereto, and may also be formed by stacking an insulating film on both surfaces of the internal insulating layer IL on which the first and second coil patterns 211 and 212 are formed.

Meanwhile, although not illustrated, at least one of the first coil pattern 211 and the second coil pattern 212 may be formed in plural. For example, the coil part 200 may have a structure in which a plurality of first coil patterns 211 are formed and the other of the first coil patterns is stacked on the lower surface of one of the first coil patterns. In this case, a separate insulating layer may be disposed between the plurality of first coil patterns 211, but is not limited thereto.

The insulating layers 610, 620, and 630 may be formed on surfaces of the body 100. According to the present exemplary embodiment, the insulating layers 610, 620, and 630 may include a first insulating layer 610 disposed on the sixth surface of the body 100, a second insulating layer 620 disposed on the fifth surface of the body 100, and a third insulating layer 630 disposed on the third and fourth surfaces of the body 100, respectively.

The insulating layers 610, 620, and 630 may be formed of a thermoplastic resin such as a polystyrene based, a vinyl acetate based, a polyester based, a polyethylene based, a polypropylene based, a polyamide based, a rubber based, and an acrylic based, a thermosetting resin such as a phenol based, an epoxy based, a urethane based, a melamine based, and an alkyd based, a photosensitive resin, parylene, SiOx, or SiNx.

The insulating layers 610, 620, and 630 may be formed by applying a liquid insulating resin to the body 100, stacking an insulating film such as a dry film (DF) on the body 100, or forming an insulating resin on the surfaces of the body by vapor deposition. As the insulating film, an Ajinomoto Build-up Film (ABF) or a polyimide film that does not include the photosensitive insulating resin may also be used.

Each of the insulating layers 610, 620, and 630 may be formed in a range of a thickness of 10 nm to 100 μm. In a case in which the thickness of the insulating layers 610, 620, and 630 is less than 10 nm, characteristics of the coil component such as a Q factor may be reduced, and in a case in which the thickness of the insulating layers 610, 620, and 630 exceeds 100 μm, the total length, width, and thickness of the coil parts increase, which is disadvantageous for thinning.

The bonded conductive layers 310 and 320 may be disposed on the first insulating layer 610. Specifically, a first bonded conductive layer 310 may be disposed between the first insulating layer 610 and the first external electrode 400 to be described below, and a second bonded conductive layer 320 may be disposed between the first insulating layer 610 and the second external electrode 500 to be described below.

A surface roughness of one surface of each of the bonded conductive layers 310 and 320 which are in contact with the first insulating layer 610 may be greater than the surface roughness of the other surface opposing one surface. That is, referring to FIGS. 2 and 5, the surface roughness of an upper surface of the first bonded conductive layer 310 which is in contact with the first insulating layer 610 may be greater than the surface roughness of a lower surface of the first bonded conductive layer 310. This will be described below in detail.

According to the present exemplary embodiment, the bonded conductive layers 310 and 320 and the first insulating layer 610 may be formed by stacking an intermediate material having an insulating film attached to one surface of a conductive film on the sixth surface of the body 100, such as resin coated copper (RCC). At this time, a copper film of RCC may have one surface which is in contact with the insulating film, and the other surface opposing one surface. A relatively high surface roughness may be formed on one surface of the copper film in order to maintain bonding force with the insulating film. As a result, a relatively high surface roughness may be formed on interfaces between the bonded conductive layers 310 and 320 and the first insulating layer 610. However, the description above is merely illustrative, and a case in which the bonded conductive layers 310 and 320 and the first insulating layer 610 are formed of an intermediate material having the insulating film attached to one surface of a conductive film other than the copper film is not excluded from the scope of the present disclosure. In addition, the description above does not exclude a case in which each of the bonded conductive layers 310 and 320 and the first insulating layer 610 is formed of a separate intermediate material from the scope of the present disclosure.

An area of one surface of each of the bonded conductive layers 310 and 320 may be greater than an area of the other surface of each of the bonded conductive layers 310 and 320. In addition, the area of each of the bonded conductive layers 310 and 320 may be reduced from one surface of each of the bonded conductive layers 310 and 320 to the other surface of each of the bonded conductive layers 310 and 320. This will be described.

Figure 5:
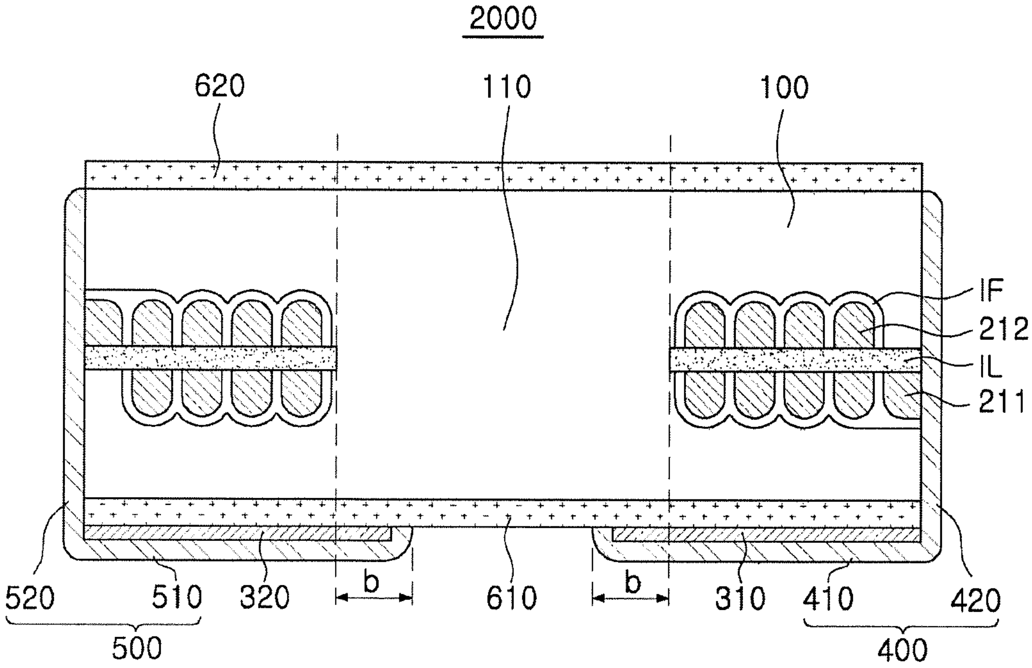
FIG. 5 is a cross-sectional view schematically illustrating a coil component according to a second exemplary embodiment in the present disclosure.

The first and second bonded conductive layers 310 and 320 may be disposed to be spaced apart from each other on the sixth surface of the body 100 by selectively removing a portion of the copper film of RCC described above. As an example, an etching resist may be formed on the copper film of RCC attached to the body 100 with the dry film, and one region of the copper film exposed through an opening of the etching resist may be removed with a copper etching solution. At this time, the other surface of the copper film may be exposed to the copper etching solution for a relatively longer time than one surface of the copper film which is in contact with the first insulating layer 610. Therefore, an amount of removed copper film may be increased on the other side of the copper film than on one side of the copper film. As a result, as illustrated in FIG. 5, the area of one surface of each of the bonded conductive layers 310 and 320 which are in contact with the first insulating layer 610 may be greater than the area of the other surface of each of the bonded conductive layers 310 and 320, and the area of each of the bonded conductive layers 310 and 320 may be reduced from one surface of each of the bonded conductive layers 310 and 320 to the other surface thereof.

The bonded conductive layers 310 and 320 may be formed of a conductive material such as copper (Cu), aluminum (Al), silver (Ag), tin (Sn), gold (Au), nickel (Ni), lead (Pb), titanium (Ti), iron (Fe), chromium (Cr), niobium (Nb), or alloys including at least one thereof, but are not limited thereto.

The external electrodes 400 and 500 may be connected to the coil patterns 211 and 212 and may be disposed to be spaced apart from each other on the lower surface of the body 100. The external electrodes 400 and 500 may include a first external electrode 400 connected to the first coil pattern 211 and a second external electrode 500 connected to the second coil pattern 212. Specifically, the first external electrode 400 may include a first connection portion 420 disposed on the first surface of the body 100 and connected to an end portion of the first coil pattern 211, and a first extension portion 410 extending from the first connection portion 420 to the sixth surface of the body 100 and covering the first bonded conductive layer 310. The second external electrode 500 may include a second connection portion 520 disposed on the second surface of the body 100 and connected to an end portion of the second coil pattern 212, and a second extension portion 510 extending from the second connection portion 520 to the sixth surface of the body 100 and covering the second bonded conductive layer 320. Since the first extension portion 410 and the second extension portion 510 are spaced apart from each other on the lower surface of the first insulating layer 610, the first external electrode 400 and the second external electrode 500 may not be in contact with each other. Each of the extension portions 410 and 510 may have one end connected to each of the connection portions 420 and 520, and the other end opposing one end, and the extension portions 410 and 510 may cover the bonded conductive layers 310 and 320.

The external electrodes 400 and 500 may be formed of a conductive material such as copper (Cu), aluminum (Al), silver (Ag), tin (Sn), gold (Au), nickel (Ni), lead (Pb), titanium (Ti), or alloys thereof, but are not limited thereto. The external electrodes 400 and 500 may be formed by vapor deposition such as sputtering or the like, or electroplating. In forming the external electrodes 400 and 500, each of the connection portions 420 and 520 and the extension portions 410 and 510 may be formed by a separate process, such that a boundary may be formed therebetween. Alternatively, the connection portions 420 and 520 and the extension portions 410 and 510 may be formed by the same process, such that the connection portions 420 and 520 and the extension portions 410 and 510 may have a boundary formed therebetween and may be integrally formed.

By doing so, the coil component 1000 according to the present exemplary embodiment may have an insulation distance between the external electrodes 400 and 500 improved by the first insulating layer 610 and improve a breakdown voltage (BDV).

In addition, in the coil component 1000 according to the present exemplary embodiment, surfaces of the extension portions 410 and 510 of the external electrodes disposed on the lower surface of the body 100, which is a mounting surface, that is, the sixth surface of the body 100 may be relatively flatly formed. That is, according to the present exemplary embodiment, since the first insulating layer 610 is disposed on the sixth surface of the body 100 and the extension portions 410 and 510 are formed on the first insulating layer 610, the first insulating layer 610 may prevent the relatively high surface roughness of the sixth surface of the body 100 from being transferred to the extension portions 410 and 510. In addition, as described above, the other surface of each of the bonded conductive layers 310 and 320 opposing one surface of each of the bonded conductive layers 310 and 320 which are in contact with the first insulating layer 610 may have a relatively low surface roughness. Since the extension portions 410 and 510 are formed on the other surface of each of the bonded conductive layers 310 and 320, the surfaces of the extension portions 410 and 510 of the external electrodes may be additionally flatly formed.

As a result, a printed circuit board or an electronic package in which the electronic component is embedded may be more easily and precisely implemented using the coil component 1000 according to the present exemplary embodiment. That is, in the case of the printed circuit board or the electronic package in which the electronic component is embedded, after the electronic component is surrounded by an insulating member to fix the electronic component, a hole machining may be optically performed on the insulating member for connection with the electronic component. Since the extension portions 410 and 510 of the external electrodes 400 and 500 applied to the coil component 1000 according to the present exemplary embodiment are relatively flatly formed due to the above mentioned reasons, scattering of light may be reduced, and the hole machining may be more precisely performed.

Second Exemplary Embodiment

Figure 6:
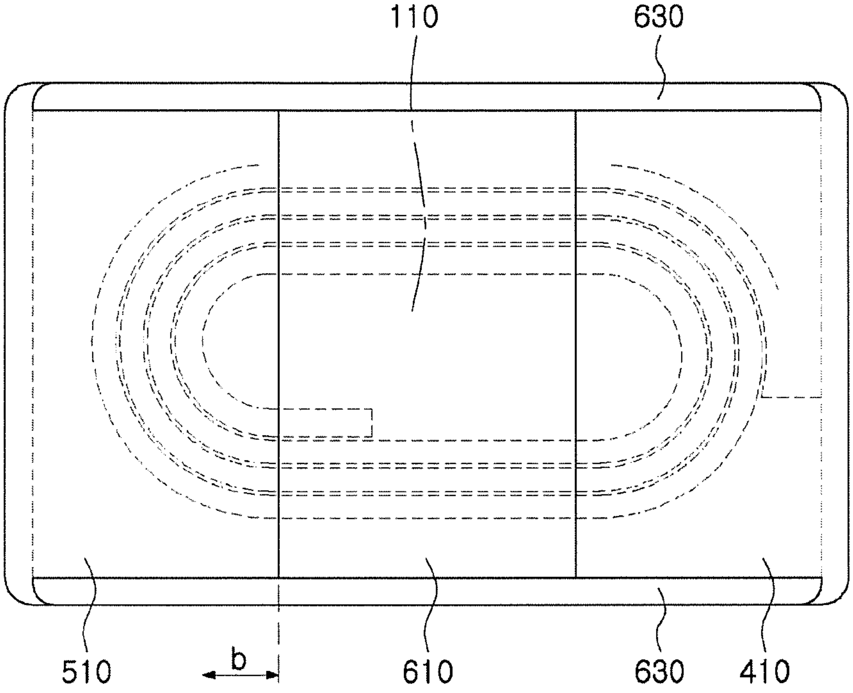
FIG. 6 is a bottom view schematically illustrating the coil component according to the second exemplary embodiment in the present disclosure.

FIG. 5 is a cross-sectional view schematically illustrating a coil component according to a second exemplary embodiment in the present disclosure. FIG. 6 is a bottom view schematically illustrating the coil component according to the second exemplary embodiment in the present disclosure. FIG. 5 corresponds to FIG. 2 illustrating the cross section according to the first exemplary embodiment in the present disclosure.

Referring to FIGS. 5 through 6, a coil component 2000 according to the present exemplary embodiment is different from the coil component 1000 according to the first exemplary embodiment in the present disclosure in the bonded conductive layers 310 and 320 and the external electrodes 400 and 500. Therefore, in describing the present exemplary embodiment, only the bonded conductive layers 310 and 320 and the external electrodes 400 and 500 will be described. The description of the first exemplary embodiment in the present disclosure may be applied to the remaining configuration of the present exemplary embodiment as it is.

According to the present exemplary embodiment, the bonded conductive layers 310 and 320 may extend to an inner side of one region of the first insulating layer 610 corresponding to the core 110. That is, referring to FIG. 5, the first bonded conductive layer 310 may extend from a boundary between the first insulating layer 610 and the first surface of the body 100 to the second surface of the body 100, and one end of the first bonded conductive layer 310 may be disposed in a region of the lower surface of the first insulating layer 610 corresponding to the core 110. Referring to FIG. 5, the second bonded conductive layer 320 may extend from a boundary between the first insulating layer 610 and the second surface of the body 100 to the first surface of the body 100, and one end of the second bonded conductive layer 320 may be disposed in a region of the lower surface of the first insulating layer 610 corresponding to the core 110. The region of the insulating layer 610 corresponding to the core 110 may refer to a region in which the core 110 is projected onto the first insulating layer 610.

Since one end of each of the bonded conductive layer 310 and 320 is disposed in the region of the lower surface of the first insulating layer 610 corresponding to the core 110, the end portions of the extension portions 410 and 510 of the external electrodes 400 and 500 may be disposed in the region of the lower surface of the first insulating layer 610 corresponding to the core 110 (b in FIGS. 5 and 6).

According to the present disclosure, the insulation distance between the external electrodes 400 and 500 may be increased by the first insulating layer 610. Therefore, even if a spaced distance between the external electrodes 400 and 500 is reduced, the risk of electric short between the external electrodes 400 and 500 may be reduced.

Therefore, according to the present exemplary embodiment, the bonded conductive layers 310 and 320, and the extension portions 410 and 510 of the external electrodes 400 and 500 may extend into the region of the lower surface of the first insulating layer 610 corresponding to the core 110.

By doing so, according to the present exemplary embodiment, a magnetic flux leaked in the thickness direction of the body 100 may be reduced.

Third Exemplary Embodiment

Figure 7:
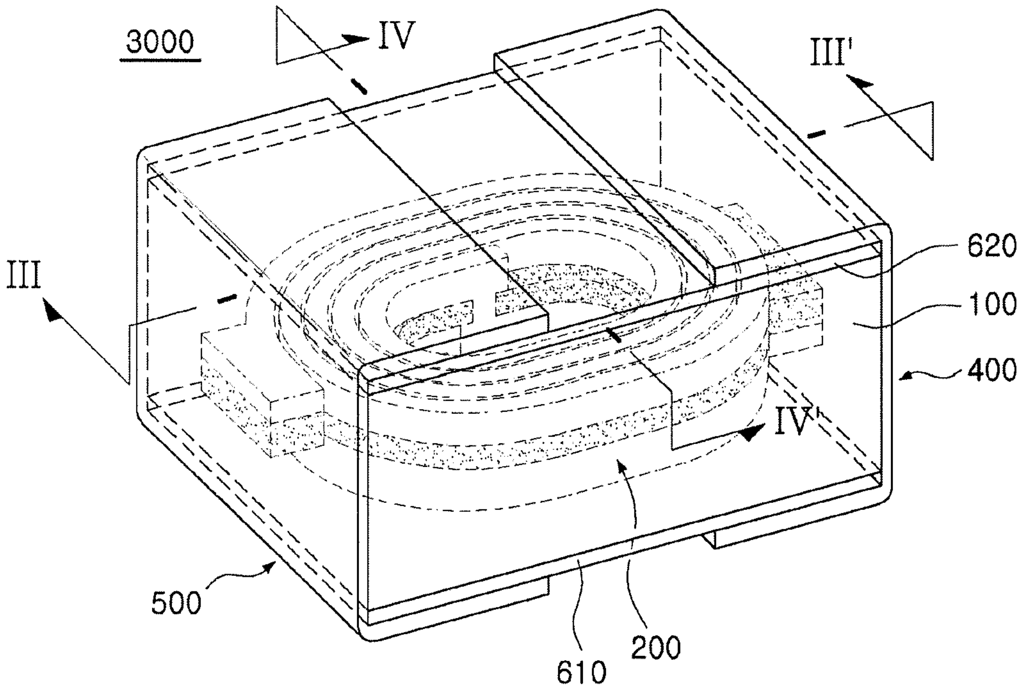
FIG. 7 is a perspective view schematically illustrating a coil component according to a third exemplary embodiment in the present disclosure.
Figure 8:
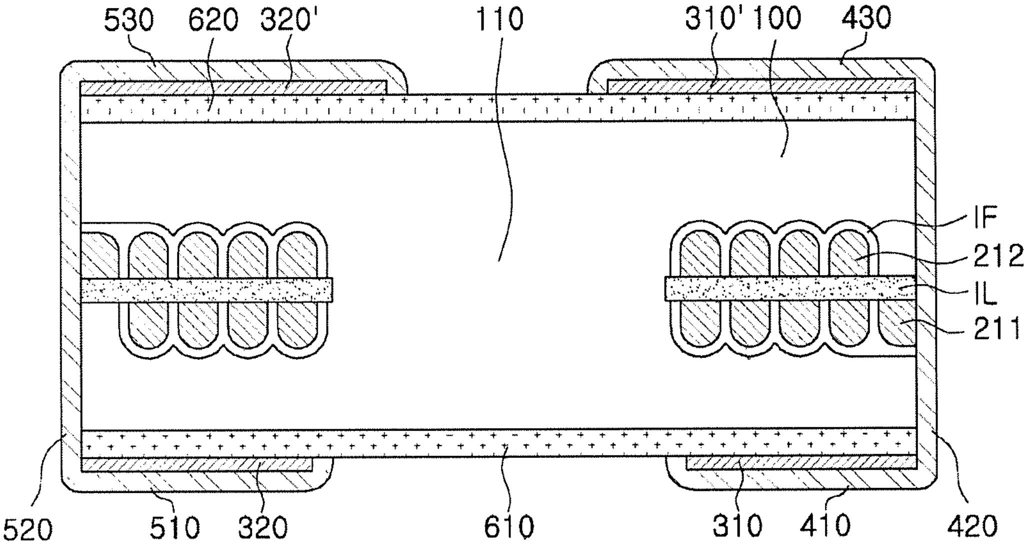
FIG. 8 is a view illustrating a cross section taken along a line III-III' of FIG. 7.
Figure 9:
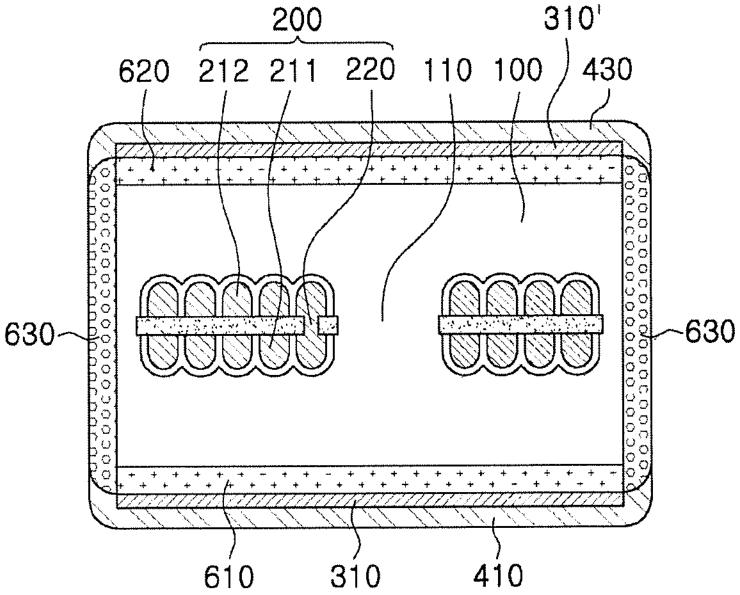
FIG. 9 is a view illustrating a cross section taken along a line IV-IV' of FIG. 7.

FIG. 7 is a perspective view schematically illustrating a coil component according to a third exemplary embodiment in the present disclosure. FIG. 8 is a view illustrating a cross section taken along a line III-III' of FIG. 7. FIG. 9 is a view illustrating a cross section taken along a line IV-IV' of FIG. 7.

Referring to FIGS. 7 through 9, a coil component 3000 according to the present exemplary embodiment is different from the coil components 1000 and 2000 according to the first and second exemplary embodiments in the present disclosure in the bonded conductive layers and the external electrodes. Therefore, in describing the present exemplary embodiment, only the bonded conductive layers 310, 320, 310', and 320' and the external electrodes 400 and 500 will be described. The description of the first and second exemplary embodiments in the present disclosure may be applied to the remaining configuration of the present exemplary embodiment as it is.

According to the present exemplary embodiment, the bonded conductive layers 310, 320, 310', and 320' may be disposed on the fifth surface and the sixth surface of the body 100, respectively. That is, referring to FIG. 8, the bonded conductive layers 310' and 320' may also be disposed on the upper surface of the body 100. Band portions 430 and 530 of the external electrodes 400 and 500 to be described below may be formed on the upper bonded conductive layers 310' and 320', respectively.

The external electrodes 400 and 500 may further include the band portions 430 and 530 disposed on the sixth surface of the body 100. That is, the external electrodes 400 and 500 may have a shape of ⊏. The band portions 430 and 530 may be formed integrally with the connection portions 420 and 520. Alternatively, the band portions 430 and 530 may form boundaries between the band portions 430 and 530 and the connection portions 420 and 520.

The coil component 3000 according to the present exemplary embodiment may reduce a magnetic flux leaked to the fifth surface and the sixth surface of the body 100. That is, the leaked magnetic flux may be more efficiently reduced as compared with other exemplary embodiments in the present disclosure.

As set forth above according to an exemplary embodiment in the present disclosure, the breakdown voltage (BDV) of the coil component may be improved.

In addition, according to the present disclosure, the shielding structure that reduces the leakage magnetic flux may be easily formed.

In addition, according to the present disclosure, the flatness of the mounting surface may be improved.

While exemplary embodiments have been shown and described above, it will be apparent to those skilled in the art that modifications and variations could be made without departing from the scope of the present invention as defined by the appended claims.

What is claimed is:

1. A coil component comprising:

a body having a first surface and a second surface opposing each other in a thickness direction of the body and including a core formed in the thickness direction;

a coil part embedded in the body and comprising at least one turn around the core;

a first insulating layer disposed on the first surface of the body;

a first bonded conductive layer disposed on the first insulating layer and having a surface roughness of a first surface which is in contact with the first insulating layer greater than a surface roughness of a second surface opposing the first surface of the first bonded conductive layer;

a second insulating layer disposed on the second surface of the body;

a second bonded conductive layer disposed on the second insulating layer; and external electrodes connected to the coil part and covering the first bonded conductive layer and the second bonded conductive layer, wherein the body further has end surfaces opposing each other while connecting the first surface and the second surface of the body to each other, and the end surfaces of the body are free of each of the first insulating layer, the first bonded conductive layer, the second insulating layer, and the second bonded conductive layer.

2. The coil component of claim 1, wherein an area of the first surface of the first bonded conductive layer is greater than an area of the second surface of the first bonded conductive layer.

3. The coil component of claim 2, wherein a planar area of the first bonded conductive layer is reduced from the first surface of the first bonded conductive layer to the second surface of the first bonded conductive layer.

4. The coil component of claim 1, wherein one end of the first bonded conductive layer is disposed on an inner side of one region of the first insulating layer corresponding to the core.

5. The coil component of claim 1, wherein both ends of the coil part are exposed to the end surfaces of the body, and the external electrodes include:

connection portions disposed on the end surfaces of the body and being in contact with the both ends of the coil part, extension portions extending from the connection portions to cover the first bonded conductive layer and disposed on the first insulating layer, and band portions extending from the connection portions to cover the second bonded conductive layer and disposed on the second insulating layer.

6. The coil component of claim 5, further comprising side insulating layers formed on side surfaces, among the plurality of wall surfaces of the body, connecting the end surfaces of the body to each other.

7. The coil component of claim 1, wherein each of the first bonded conductive layer and the second bonded conductive layer includes at least one of copper (Cu), aluminum (Al), silver (Ag), tin (Sn), gold (Au), nickel (Ni), lead (Pb), titanium (Ti), iron (Fe), chromium (Cr), and niobium (Nb).

8. The coil component of claim 1, wherein an insulating film is disposed on the surfaces of the coil part.

9. The coil component of claim 1, wherein a thickness of each of the first insulating layer and the second insulating layer is in a range of 10 nm to 100 μm.

10. The coil component of claim 1, wherein the second bonded conductive layer has a surface roughness of a first surface which is in contact with the second insulating layer greater than a surface roughness of a second surface opposing the first surface of the second bonded conductive layer.

11. The coil component of claim 10, wherein an area of the first surface of the second bonded conductive layer is greater than an area of the second surface of the second bonded conductive layer.

12. The coil component of claim 11, wherein a planar area of the second bonded conductive layer is reduced from the first surface of the second bonded conductive layer to the second surface of the second bonded conductive layer.

13. The coil component of claim 1, wherein one end of the second bonded conductive layer is disposed on an inner side of one region of the second insulating layer corresponding to the core.

* * * * *